US009255522B2

United States Patent
Sancewich et al.

(10) Patent No.: US 9,255,522 B2
(45) Date of Patent: Feb. 9, 2016

(54) MODULAR DROP-IN TRANSITION ASSEMBLY FOR INDUSTRIAL GAS TURBINE AND METHOD FOR INSTALLATION

(71) Applicants: Glenn E. Sancewich, Cocoa, FL (US); Jose L. Alonso, Debary, FL (US); Daniel E. Ford, Winter Springs, FL (US)

(72) Inventors: Glenn E. Sancewich, Cocoa, FL (US); Jose L. Alonso, Debary, FL (US); Daniel E. Ford, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 678 days.

(21) Appl. No.: 13/672,878

(22) Filed: Nov. 9, 2012

(65) Prior Publication Data

US 2014/0123656 A1 May 8, 2014

Related U.S. Application Data

(63) Continuation-in-part of application No. 13/670,741, filed on Nov. 7, 2012, now Pat. No. 9,127,593.

(51) Int. Cl.
*F02C 7/00* (2006.01)
*F01D 9/02* (2006.01)
*F01D 25/28* (2006.01)

(52) U.S. Cl.
CPC . *F02C 7/00* (2013.01); *F01D 9/026* (2013.01); *F01D 25/285* (2013.01); *F05D 2230/60* (2013.01); *F05D 2230/68* (2013.01); *F05D 2230/70* (2013.01); *F05D 2230/80* (2013.01); *F23R 2900/00017* (2013.01)

(58) Field of Classification Search
CPC ............ F23R 2900/00017; F23R 2900/00019; F01D 25/285; F05D 2230/60; F05D 2230/70; F05D 2230/72; F05D 2230/80
See application file for complete search history.

(56) References Cited

U.S. PATENT DOCUMENTS

| 5,911,680 A | 6/1999 | Takeoka |
| 5,921,075 A | 7/1999 | Shimoyama et al. |

(Continued)

FOREIGN PATENT DOCUMENTS

| DE | EP 2070663 A1 * | 6/2009 | ............... B25J 9/042 |
| EP | 2070663 A1 | 6/2009 | |

(Continued)

OTHER PUBLICATIONS

U.S. Appl. No. 13/670,741, filed Nov. 7, 2012, entitled Modular Drop-In Combustor Assembly for Industrial Gas Turbine and Method for Installation.

*Primary Examiner* — Phutthiwat Wongwian
*Assistant Examiner* — Marc Amar

(57) ABSTRACT

A preassembled modular drop-in transition having internal components in conformity with assembly and function specifications prior to and after insertion into an industrial gas turbine access port. The transition assembly maintains conformity with those specifications after insertion into the combustor case if it does not inadvertently impact other turbine components during its installation. Inadvertent impact is avoided by having a combustor service zone proximal the combustor case, enabling slidable insertion of each transition and/or combustor assembly into its corresponding access port along its corresponding insertion path without contacting other turbine system components. A multi-axis motion transition handling tool (THT) in the combustor service zone, preferably under automatic control, is coupled to a transition and facilitates precise alignment along the insertion path. Automatic control facilitates consistent repetitive transition installation and removal by executing a sequence of stored pre-determined manipulation steps.

10 Claims, 12 Drawing Sheets

(56) References Cited

U.S. PATENT DOCUMENTS

| | | | |
|---|---|---|---|
| 6,141,862 A * | 11/2000 | Matsui | F01D 25/285 29/278 |
| 2011/0000080 A1 * | 1/2011 | Arase | F01D 9/023 29/700 |
| 2012/2015995 | 6/2012 | Shiotani et al. | |

FOREIGN PATENT DOCUMENTS

| | | |
|---|---|---|
| EP | 2236939 | 10/2010 |
| EP | 2500653 | 9/2012 |
| JP | H10196402 | 7/1998 |
| JP | H10196959 | 7/1998 |
| JP | 10231737 A | 9/1998 |

\* cited by examiner

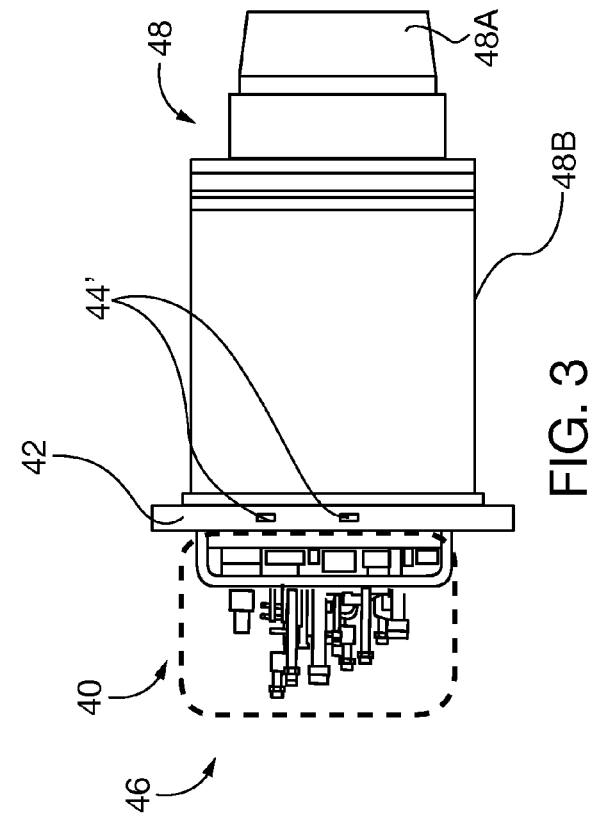
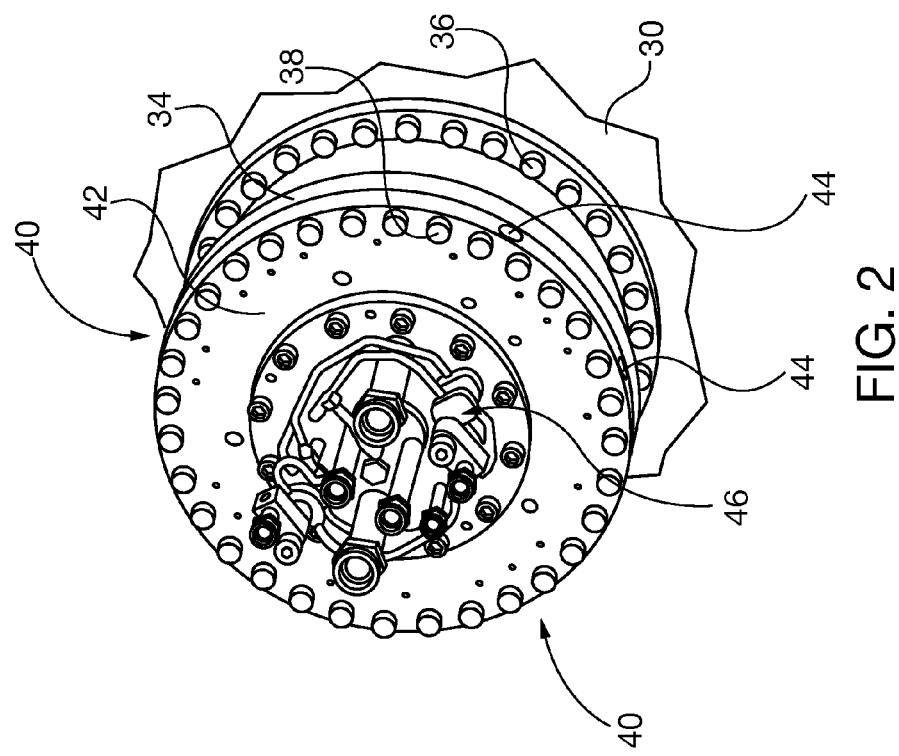

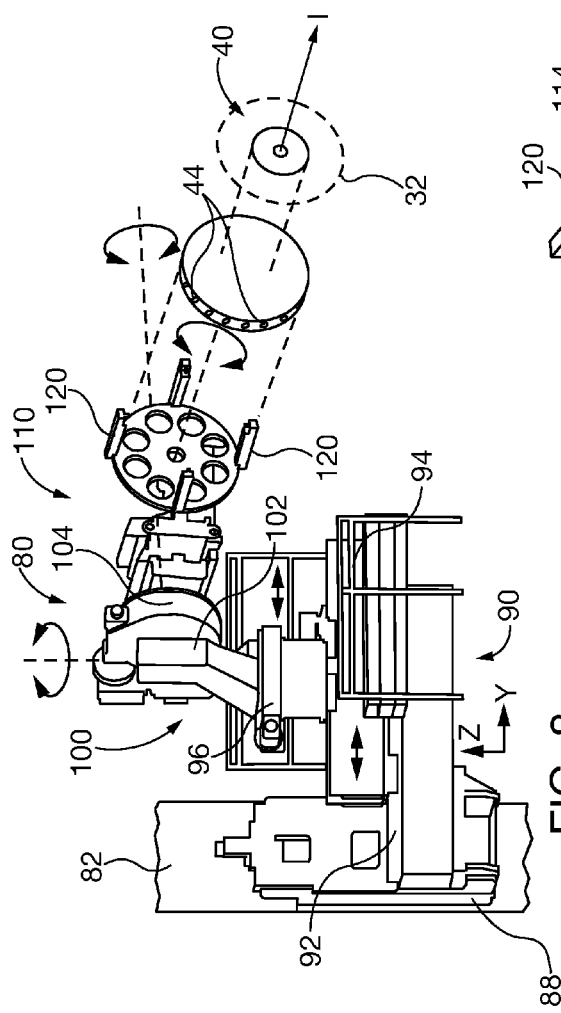
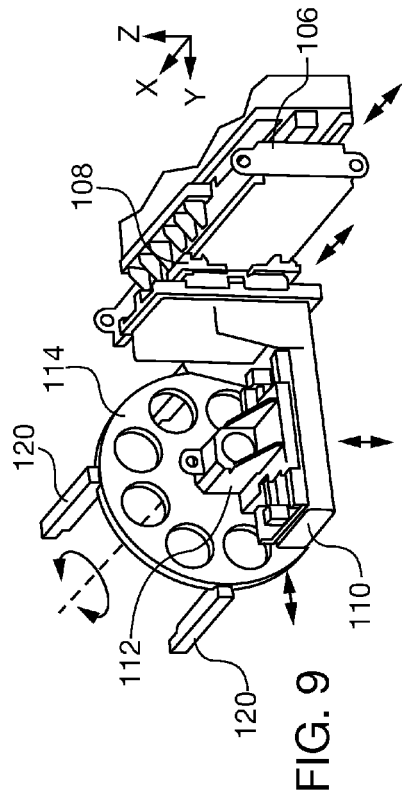
FIG. 8
FIG. 9

MODULAR DROP-IN TRANSITION ASSEMBLY FOR INDUSTRIAL GAS TURBINE AND METHOD FOR INSTALLATION

CROSS-REFERENCE TO RELATED APPLICATIONS

This application is a continuation-in-part of U.S. patent application entitled "MODULAR DROP-IN COMBUSTOR ASSEMBLY FOR INDUSTRIAL GAS TURBINE AND METHOD FOR INSTALLATION", filed Nov. 7, 2012, and assigned Ser. No. 13/670,741, now U.S. Pat. No. 9,127,593, issued on Sep. 8, 2015, the entire contents of which is incorporated by reference herein.

BACKGROUND OF THE INVENTION

1. Field of the Invention

The invention relates to combustors and transitions for industrial gas turbines, and more particularly modular drop-in combustors and transitions that are preassembled in conformity with assembly and function specifications prior to installation into an industrial gas turbine. The invention also relates to methods for installation of transitions into an industrial gas turbine.

2. Description of the Prior Art

Known industrial gas turbines utilize replaceable combustors with flanged connections to access ports in the combustor case. In known combustor designs a generally annular-shaped combustor basket has an open tip portion distal the combustor flange that is inserted in nesting fashion into a corresponding inlet end of a combustor transition along an insertion path that is coaxial with the centerlines of the respective access port, combustor basket and transition opening. The transition is inserted prior to the combustor along an insertion path that is also coaxial with the centerline of the respective access port. A known inlet support fixes relative orientation of the transition inlet port and the access port. Thereafter the combustor is inserted into the transition opening. Transition and combustor insertion are often performed sequentially with cranes and/or block and tackle gear to hold their respective weight, in conjunction with human alignment of both along their common coaxial alignment path within the combustor case. The respective combustor and transition lengths are much greater than their respective radial clearance between those assemblies' outer circumferences and other turbine components that are inside or outside the combustor case. A small yaw deviation of the either the transition or combustor assemblies from their respective desired insertion paths may result in inadvertent impact contact between an assembly and another turbine component—possibly resulting in misalignment out of conformance with alignment and function specifications.

In known turbine designs there is insufficient clearance between a fully assembled combustor or transition assembly and other turbine components that are external the combustor case, so it becomes impossible to align and insert a fully assembled combustor. Fully assembled combustor weight of over 1200 pounds (545 kg) further complicates precise combustor alignment during installation, especially if alignment is primarily performed by human operators. Similarly, a fully assembled transition weighs over 242 pounds (110 kg) and typically has a relatively difficult to maneuver length to radial clearance ratio of approximately 5:1. The relatively long and thin transition assembly has to be inserted fully within the combustor case with only slight yaw deviation from its alignment path. For example, during initial insertion of the transition assembly exit end into the combustor access port there is only approximately 0.6 inch (16 mm) total minimum radial clearance between the exit end outer periphery and the access port inner diameter.

Given lack of fully assembled combustor installation clearance and alignment complexities that are exacerbated by combustor weight, the known industry solution is to assemble combustor sub components in situ within the combustor case access port during initial assembly, service and field maintenance and insertion of the combustor. Assembly of sub components within a combustor access port to build a complete combustor and subsequent inspection for conformity with alignment/performance specifications is much slower than factory or authorized service facility bench assembly and inspection. Factory and/or service center pre-assembly in a controlled environment may also be performed by dedicated assembly specialists who may have more practical assembly experience and skills than some field personnel who must perform a broader range of repair services. Unfortunately pre assembly of drop in combustors is not feasible if there is insufficient installation clearance for fully assembled units, or if required installation precision alignment cannot be achieved reliably and consistently in the field due to component gross weight or lack of precise alignment fixtures.

With respect to transition installation known challenges, both the transition inlet mouth and exit mouth simultaneously require precise radial alignment of a relatively axially long tubular structure that is inserted into a blind cavity through an access port. Small tolerances are needed for proper coaxial alignment of the transition inlet to the combustor basket exit mouth require relatively precise co-axial alignment of the transition inlet mouth with the combustor case access port along the insertion/alignment path. Additionally, precise alignment of the transition assembly exit mouth to the gas turbine section inlet face along the insertion path is required. The transition exit must mate with transition seals that are necessary for elimination of air leakage at the transition exit/turbine section inlet interface.

There is a need for industrial gas turbines with sufficient external clearance outside the combustor case that facilitate direct alignment and installation of preassembled transitions into combustor case access ports along an installation path without undue risk of inadvertent transition contact/impact with other turbine components inside or outside the combustor case, that may damage the transition or the other contacted components.

There is also a need for a transition handling tool and transition installation method that facilitate alignment and insertion of heavy pre-assembled relatively long transitions, preferably under automatic control, with repeatable manipulation steps. Ideally such a transition handling tool can remain permanently installed proximal the combustor case access ports for use as needed, or easily transported to and reassembled at various job sites by repair personnel.

SUMMARY OF THE INVENTION

Accordingly, an object of the invention is to provide industrial gas turbines with sufficient external clearance outside the combustor case that facilitate direct alignment and installation of pre-assembled transitions into combustor case access ports along an installation path without undue risk of inadvertent transition contact/impact with other turbine components inside or outside the combustor case, that may damage the transition.

Another object of the invention is to provide a transition handling tool and method of transition installation that facilitate alignment and insertion of heavy preassembled transitions, preferably under automatic control, with repeatable manipulation steps. Additionally it is desirable for the a transition handling tool to remain permanently installed proximal the combustor case access ports for use as needed, or easily transported to and reassembled at various job sites by repair personnel.

These and other objects are achieved in accordance with the invention by a preassembled modular drop-in transition assembly having internal components in conformity with assembly and function specifications prior to and after insertion into an industrial gas turbine access port. The transition assembly maintains conformity with those specifications after insertion into the combustor case if it does not inadvertently impact other turbine components during its installation. Inadvertent impact is avoided by having a combustor service zone proximal the combustor case, enabling slidable insertion of each combustor and/or transition assembly into its corresponding access port along its corresponding insertion path without contacting other turbine system components. A multi-axis motion transition handling tool (THT) in the combustor service zone, preferably under automatic control, is coupled to each transition and facilitates precise alignment along the insertion path. Automatic control facilitates consistent repetitive combustor and/or transition installation and removal by executing a sequence of stored pre-determined manipulation steps.

Embodiments of the invention feature a method for installing a preassembled transition assembly in an industrial gas turbine by slidable insertion along an insertion path through a combustor access port, without impacting other turbine components that might damage or otherwise alter the transition assembly. The preassembled transition assembly can be inspected and pre-certified as conforming with assembly and function specifications prior to installation as a drop-in unit. The transition assembly may be inserted with a powered multi-axis transition handling tool (THT) whose manipulation is preferably under automatic control, for predictably repeatable alignment manipulation motions.

Embodiments of the invention also feature a preassembled modular drop-in transition assembly adapted for slidable insertion in an industrial gas turbine combustor case access port along an insertion path that is coaxially aligned with the access port along an insertion path. The transition assembly is further adapted for coupling to a transition handling tool. The transition assembly has internal components in conformity with assembly and function specifications prior to and after insertion into an industrial gas turbine access port, so long as the transition assembly does not impact other turbine components during insertion. The drop-in, ready-to-use transition assembly may be "pre-certified" as conforming with assembly and function specifications, so that field installation inspection procedures do not have to be repeated.

Embodiments of the invention additionally feature an industrial gas turbine system, including a gas turbine having compressor, combustor and turbine sections. The combustor section has a combustor case defining a plurality of respective corresponding pairs of combustor access ports aligned in a circular array and corresponding respective transition assembly insertion paths in the combustor case that are coaxially aligned with its respective access port. The turbine system has a plurality of preassembled modular drop-in transition assemblies corresponding to each of the corresponding pairs of combustor access ports and insertion paths adapted for slidable insertion into its access port along its insertion path. The turbine system has a combustor service zone proximal the combustor case, enabling slidable insertion of each transition assembly into its corresponding access port along its corresponding insertion path without contacting other turbine system components. The turbine system preferably has a powered multi-axis motion transition handling tool (THT) oriented in the combustor service zone, adapted for coupled to each respective transition assembly, for insertion thereof into the combustor case along its respective insertion path. A controller is preferably coupled to and controls movement of the THT in a sequence of pre-determined combustor insertion manipulation steps. An embodiment of the THT has a vertical support column and a lifting platform that is coupled to the vertical support column, for selectively varying vertical elevation relative to the combustor case. A transition alignment platform is coupled to the lifting platform, for selectively varying transverse, axial and rotational positions relative to the combustor case. A transition gripper is coupled to the transition alignment platform, for coupling to the transition assembly.

The objects and features of the invention may be applied jointly or severally in any combination or sub-combination by those skilled in the art.

BRIEF DESCRIPTION OF THE DRAWINGS

The teachings of the invention can be readily understood by considering the following detailed description in conjunction with the accompanying drawings, in which:

FIG. 2 shows a perspective view of an embodiment of a preassembled combustor assembly of the invention installed in a combustor case access port of the gas turbine of FIG. 1;

FIG. 3 shows a side elevational view of the preassembled combustor assembly of FIG. 2;

FIG. 8 is an elevational view of an embodiment of the combustor alignment platform of the CHT of FIG. 7;

FIG. 9 is a perspective view of an embodiment of the combustor alignment platform and combustor flange gripper of the CHT of FIG. 7.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in a preassembled modular drop-in combustor and/or transition having internal components in conformity with assembly and function specifications prior to and after insertion into an industrial gas turbine access port. The combustor and/or transition assembly maintains conformity with those specifications after insertion into the combustor case if either does not inadvertently impact other turbine components during its installation. Inadvertent impact is avoided by having a combustor service zone proximal the combustor case, enabling slidable insertion of each combustor and/or transition assembly into its corresponding access port along its corresponding insertion path without contacting other turbine system external or internal components. A respective multi-axis motion combustor or transition handling tool in the combustor service zone, preferably under automatic control, is coupled to a respective combustor and/or transition and facilitates precise alignment along the insertion path. Automatic control facilitates consistent repetitive combustor installation and removal by executing a sequence of stored pre-determined manipulation steps.

Figure 1:
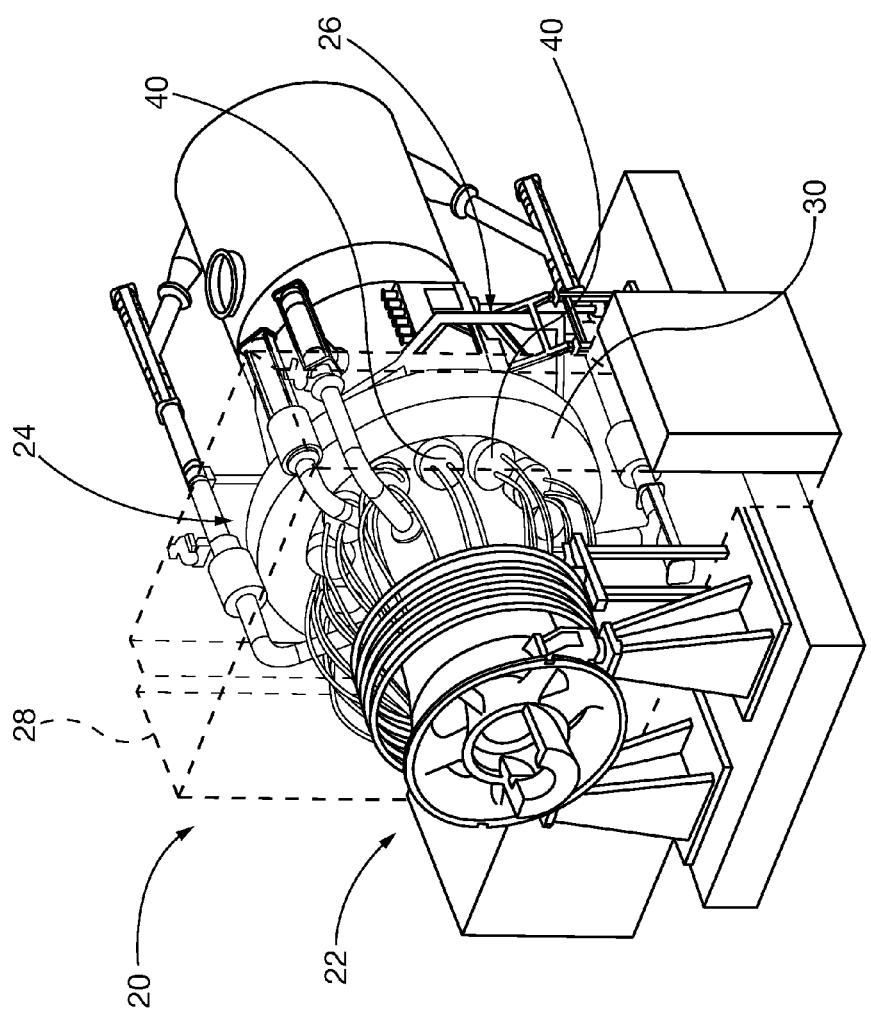
FIG. 1 shows a perspective view of an embodiment of an industrial gas turbine system of the invention.

FIG. 1 shows an industrial gas turbine 20 of the invention that includes compressor section 22, combustor section 24 and turbine section 26. The turbine 20 has a combustor service zone 28, depicted in dashed lines, in which all piping, wiring, etc. is removable for clear access to the combustor case 30 and the combustor assemblies 40. The combustor service zone is also applicable for transition installation.

Figure 4:
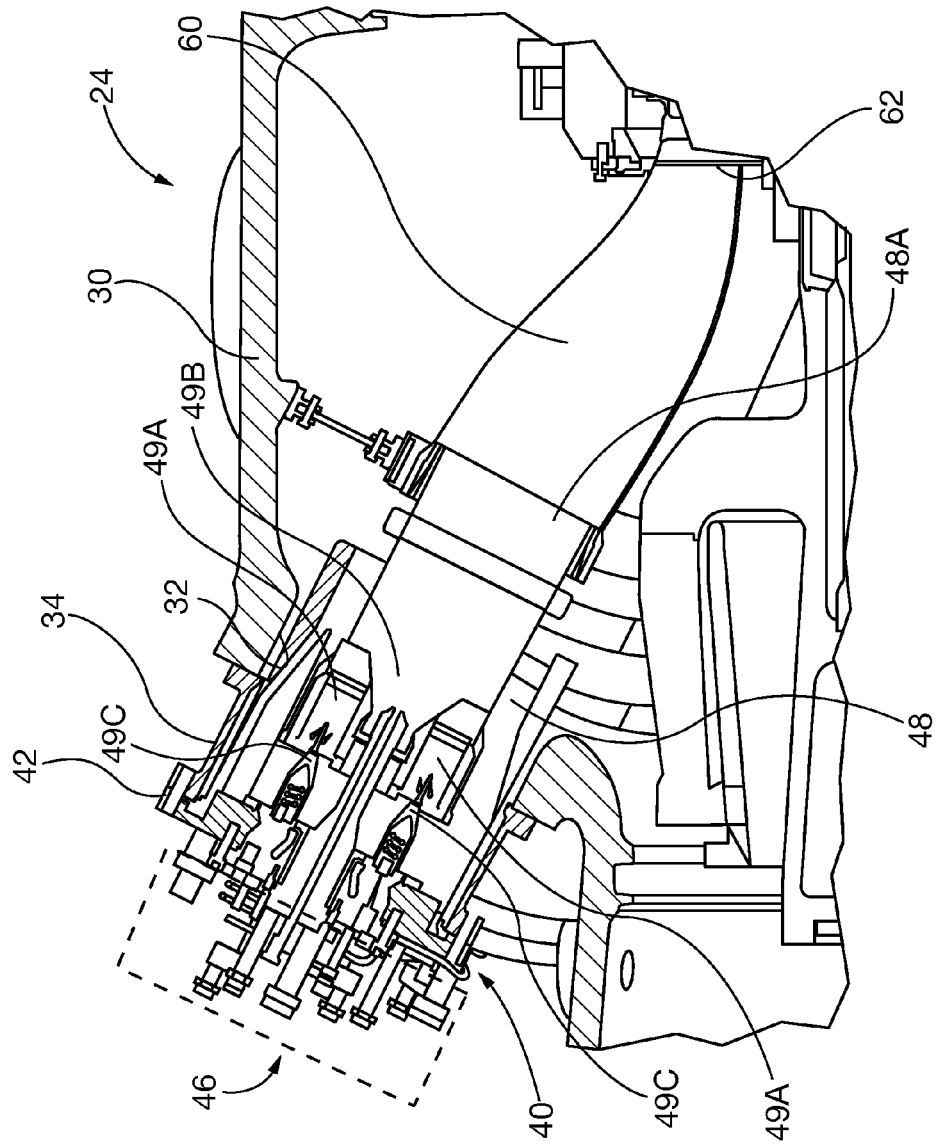
FIG. 4 shows a partial cut-away view of the a preassembled combustor assembly of FIGS. 2 and 3 installed within a combustor case of the gas turbine of FIG. 1.

Referring to FIGS. 2-4, each combustor assembly 40 has a mounting flange 42 that is coupled to the combustor case 30 access ports 32 by an intermediate spool piece 34 and circular arrays of fasteners 36, 38. The mounting flange 42 also has threaded apertures 44 four coupling to the combustor handling tool (CHT) of FIGS. 7-10. The combustor assembly 40 is preassembled and inspected for conformance with assembly and functional specifications prior to installation in the combustor case 30. Preassembled components forming the combustor assembly 40 include externally mounted fuel injectors and instrumentation 46, of known operation and construction. The combustor basket 48 is of generally annular hollow construction, and houses swirlers 49A as well as venturi 49B and combustion nozzles 49C. The tip 48A of the combustor basket 48 that is distal the combustor mounting flange 42 slidably mates with a corresponding inlet mouth or end of combustor transition 60. The transition 60 distal exit end 62 directs combustion gasses toward the turbine section 26. The transition inlet mouth is supported by an inlet support of known structure. The combustor basket tip 48A outer circumference conforms generally to the transition 60 inner diameter. The combustor basket outer circumference 48B has relatively tight radial clearance within the corresponding access port 32 inner circumference of approximately 1 inch (25 mm), compared to an approximate axial length from the combustor mounting flange 42 to the combustor basket tip 48A of at least 24 inches (600 mm). As the combustor assembly 40 ratio of radial clearance to axial length is relatively small (at least approximately 0.04), slight yawing deviations of the combustor relative to its insertion path that is established in the axial centerline between the access port 32 and transition 60 inner circumferences may cause inadvertent combustor assembly contact with turbine 20 internal components. Any such internal contact may inadvertently cause the combustor assembly 40 damage or misalignment that may cause it to deviate from alignment and/or functional specifications.

Figure 5:
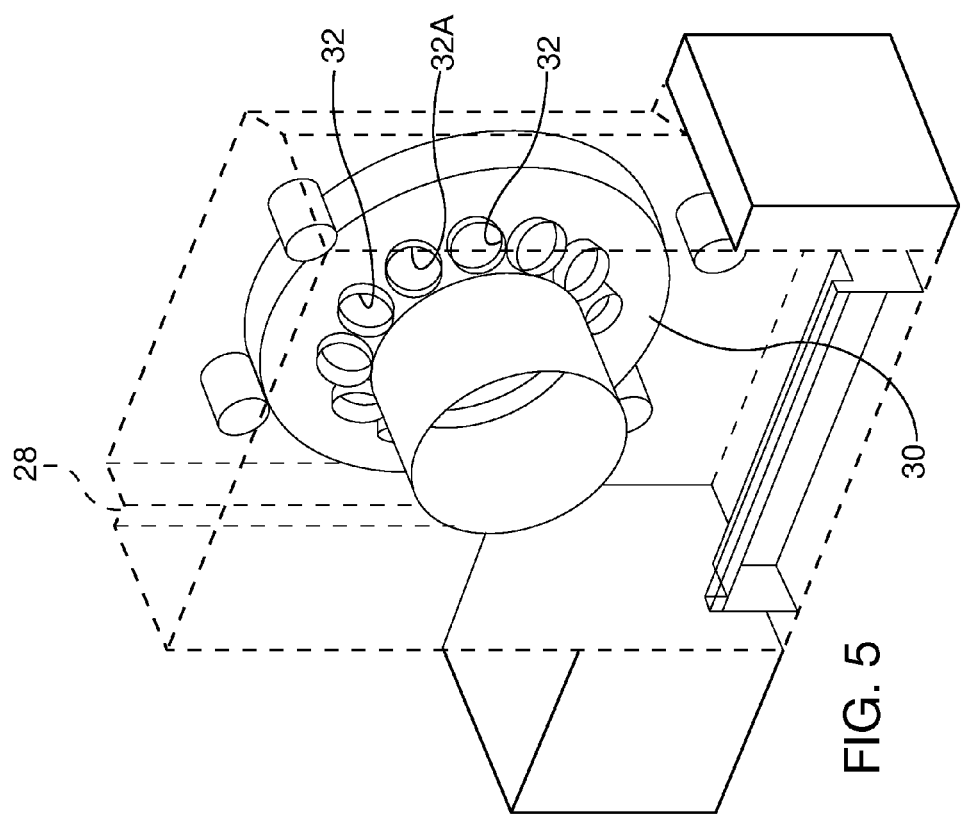
FIG. 5 shows a perspective view of an embodiment of an industrial gas turbine combustor case and access ports and combustor service zone of the invention.
Figure 6:
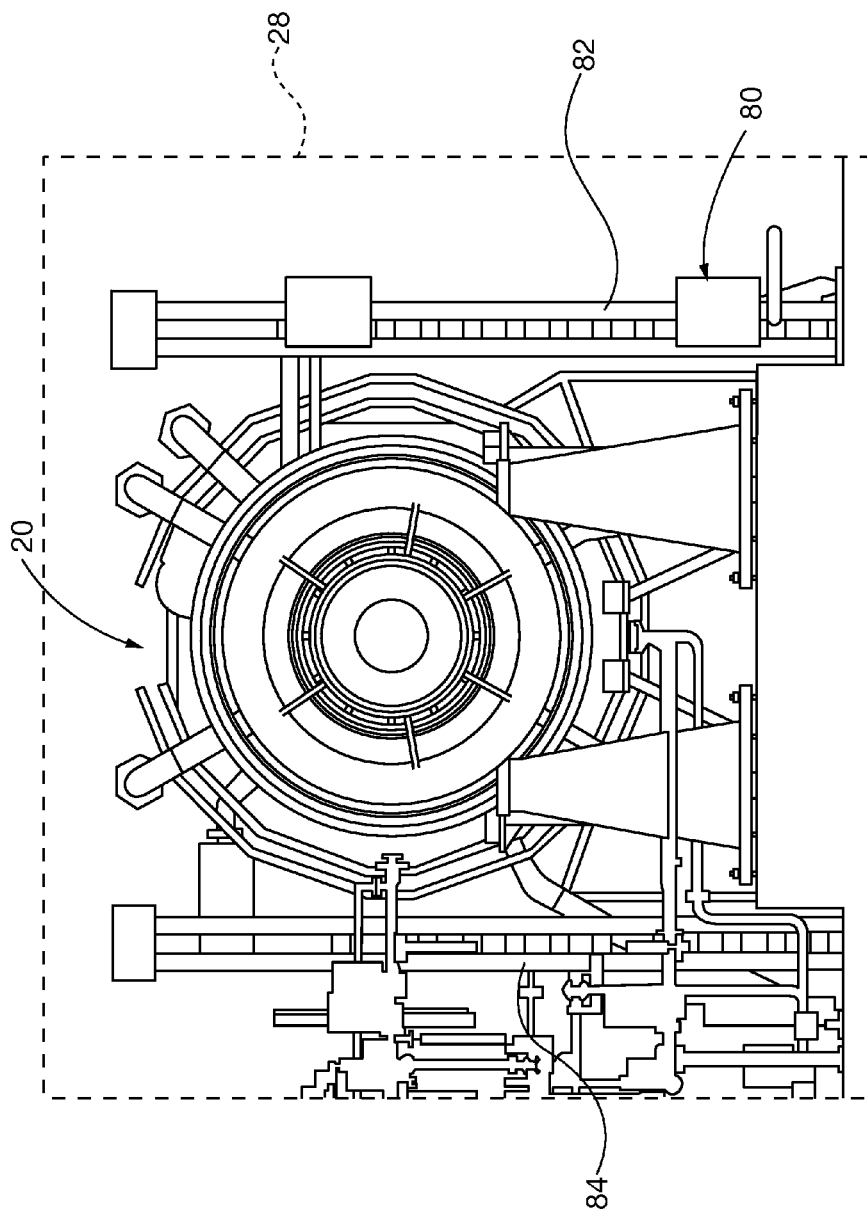
FIG. 6 shows an end elevational view of the gas turbine of FIG. 1 and vertical support columns of an embodiment of the combustor handling tool (CHT) of the invention located within the combustor service zone.

In the gas turbine 20 of the invention, the open, uncluttered combustor service zone 28, shown in both FIGS. 1 and 5, prevents combustor assembly 40 damage while being aligned along the insertion path into the access port 32. In the service zone 28 there are no turbine external components interfering with combustor assembly maneuvering. However, as noted above, yawing misalignment deviations from the desired insertion path during combustor assembly 40 insertion into the combustor case 30 can cause damage.

Embodiments of the invention include a combustor handling tool (CHT) 80, shown in FIGS. 6-10, that facilitates proper alignment and insertion of the relatively heavy combustor assembly 40 into its corresponding combustor case access port 32 in the combustor service zone 28 that is associated with gas turbine 20. The CHT 80 includes a right support column 82, for servicing combustor assemblies on the right side of the combustor case 30 and a left support column 84, for servicing combustor assemblies on the left side of the combustor case 30. In the preferred embodiment of the invention separate mirror image combustor handling tools are dedicated to the respective right and left support columns 82, 84, but it is also possible to share CHT components for use on either side of the turbine 20.

Figure 7:
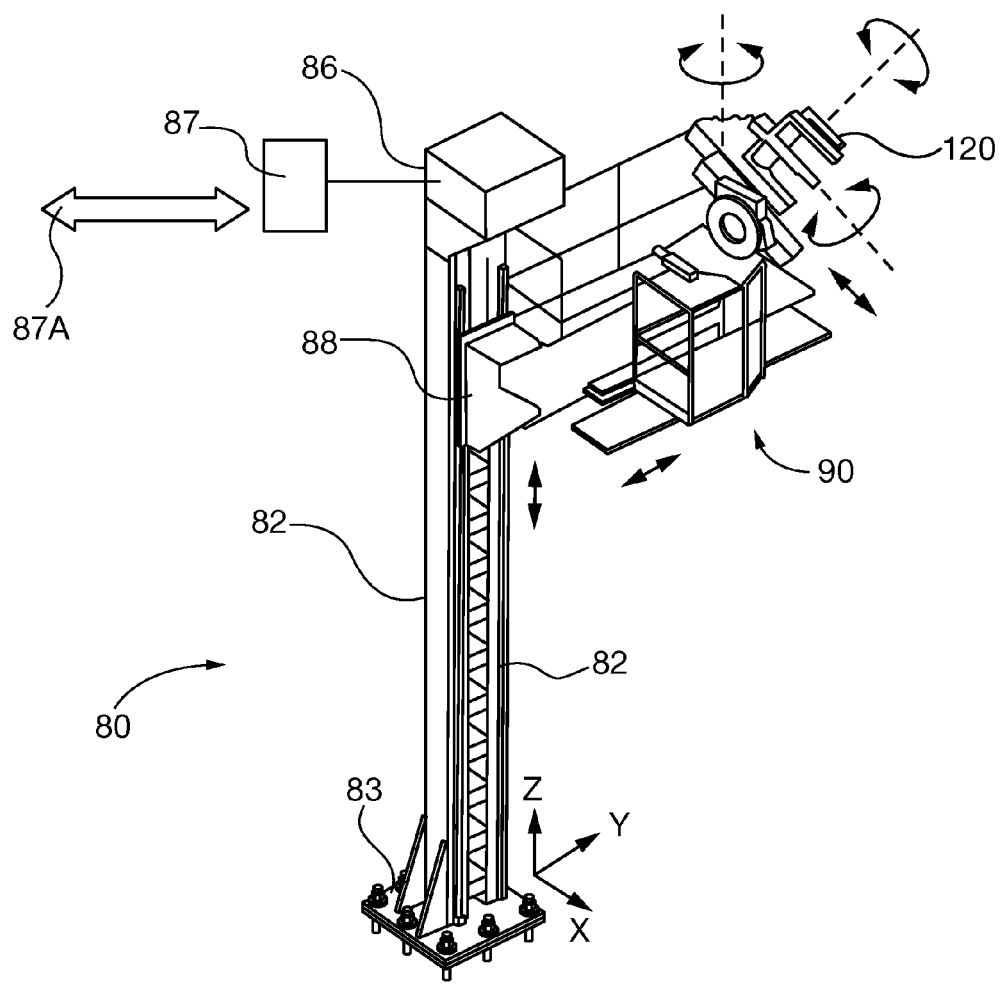
FIG. 7 is a perspective view of an embodiment of a combustor handling tool (CHT) of the invention.

As shown in the perspective view of FIG. 7, the CHT 80 for the right column 82 is shown. A mirror image may be affixed to the left column. The right support column 82 is selectively or permanently coupled to the turbine 20 pad floor structures by foundation mounting plate 83. It is possible to move the CHT 80 and its support column 82 from facility to facility for field service, but it is preferable to leave at least one CHT permanently at a facility. A motorized or hydraulic crane drive 86 is affixed to the column 82 to provide power for moving the multi-axis CHT 80. The crane drive 86 is under control of controller 87. Alternatively, each range of motion of CHT 80 or clusters of motion ranges may be driven by separate drives under control of controller 87 or a plurality of inter-communicating controllers.

As shown in FIGS. 7-9, the lifting platform 88 provides CHT vertical elevation motion in the Z axis (shown). A combustor alignment platform 90 provides gross left-right (Y axis) motion by first slider 92, second slider 94, and third slider 96. Gross fore-aft (X axis) motion for insertion of the combustor assembly 40 into the combustor case access port 32 is facilitated by fourth and fifth sliders 106, 108. Fine translation motion for final combustor assembly 40 movement, for example for centering the combustor 40 assembly concentrically within the access port 32 and transition 60 along insertion path I, is provided by slider 110 in the Z axis and slider 112 in the in the Y axis. The CHT 80 also facilitates rotational motion about the three coordinate axes. Turret assembly 100 provides pan or sweep rotation about the Z axis 102, turret assembly 104 provides tilt or inclination/declination rotation about the Y axis, and hub 114 provides rotational about the X axis (for example for aligning combustor hub 42 bolt pattern with that of the spool piece 34 for subsequent insertion of the fasteners 38.

Figure 10:
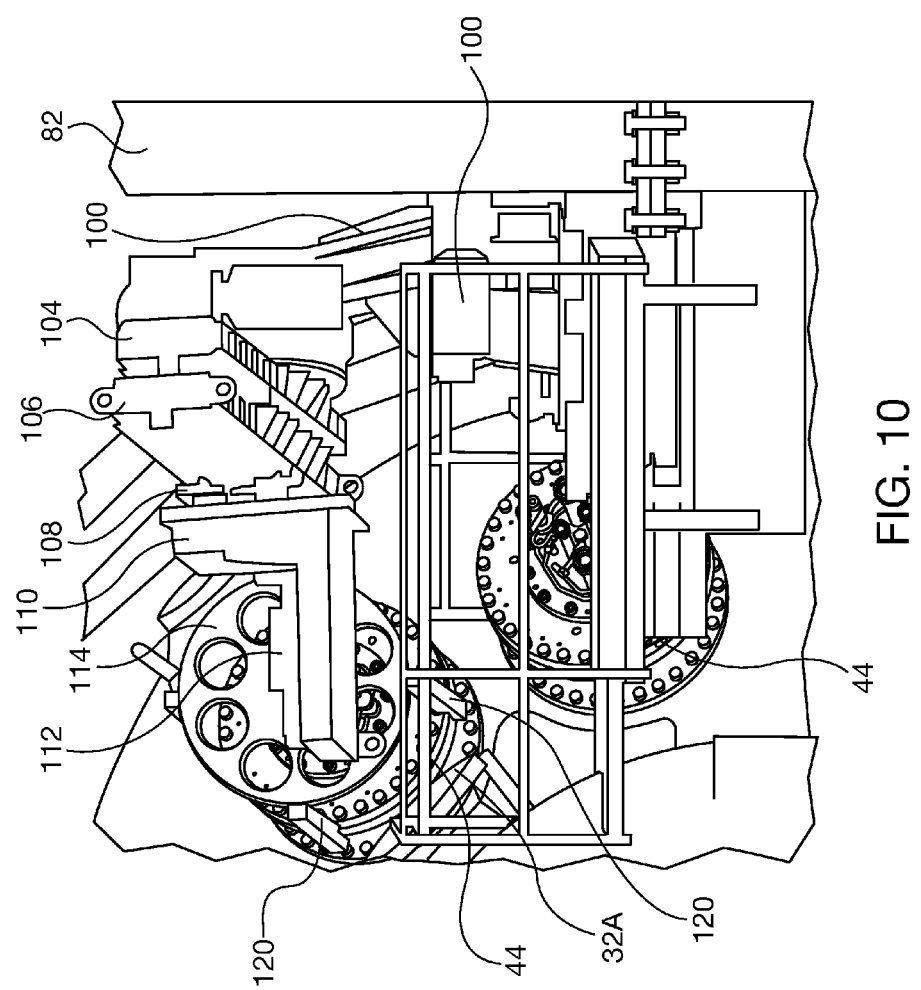
FIG. 10 is a front elevational view of the CHT of FIG. 7 installing a preassembled combustor of the invention in the combustor service zone of the industrial gas turbine of FIG. 1.

Referring to FIGS. 9 and 10, hub 114 retains a plurality of grippers 120 that are coupled to apertures 44 in the combustor mounting flange 42 with threaded fasteners. Other types of known mechanical coupling devices may substituted for threaded fasteners and apertures 44 in the mounting flange 42, including by way of example hydro-mechanical or electro-mechanical gripper claws and mating structures in the mounting flange 42, mating keys/keyways or pins/apertures, etc. In FIG. 10 the CHT 80 is inserting a combustor assembly 40 into combustor access port 32A, that is oriented at approximately the 1 o'clock radial position in the combustor case 30 (see also FIG. 5). The CHT 80 aligns the combustor assembly 40 concentrically with the insertion path I, which needed to insert it into access port 32A and the awaiting corresponding transition 60, without inadvertently impacting the combustor basket 48 or other combustor assembly components with other turbine components within the combustor case 30.

As previously noted the CHT 80 motions are controlled by controller 87, which may be a programmable logic controller or a personal computer that utilizes a processor and operating system that accesses a stored instruction set. The controller 87 preferably stores a set of CHT 80 motion instructions needed to align and insert combustor assemblies 40 with each individual turbine access port 32 within reach of the CHT. For example in FIG. 10, the CHT 80 is capable of inserting all combustor assemblies 40 into access ports on the right side of turbine 20, and a mirror image CHT coupled to the left support column 84 inserts combustor assemblies 40 into access ports 32 on the left side of turbine 20. Motion instruction sets stored in the controller 87 are derived from virtual and/or actual CHT 80 multi-axis manipulation. A motion instruction set that successfully aligns and installs/retracts combustor assemblies 40 in combustor case access ports 32 is stored in the controller 87 and may be downloaded to other controllers. If needed, individual motion instruction sets may be modified to conform to alignment variations needed at different gas turbine installations. The controller 87 may be in wired or wireless communication with a network 87A, such as a power plant local area network or the Internet, for remote monitoring of combustor assembly installation and for receipt of updated or new motion instruction sets.

Embodiments of the present invention include a transition handling tool (THT) 150, shown in FIGS. 11-15, that facilitates proper alignment and insertion of the relatively heavy, long and thin transition assembly 60 into its corresponding combustor case access port 32 in the combustor service zone 28 that is associated with gas turbine 20. The THT 150 and CHT 80 share the same right support column 82, for servicing transition and/or combustor assemblies on the right side of the combustor case 30 and left support column 84, for servicing transition and/or combustor assemblies on the left side of the combustor case 30. In the preferred embodiment of the present invention separate mirror image combustor and/or transition handling tools are dedicated to the respective right and left support columns 82, 84, but it is also possible to share THT or CHT components for use on either side of the turbine 20.

Figure 11:
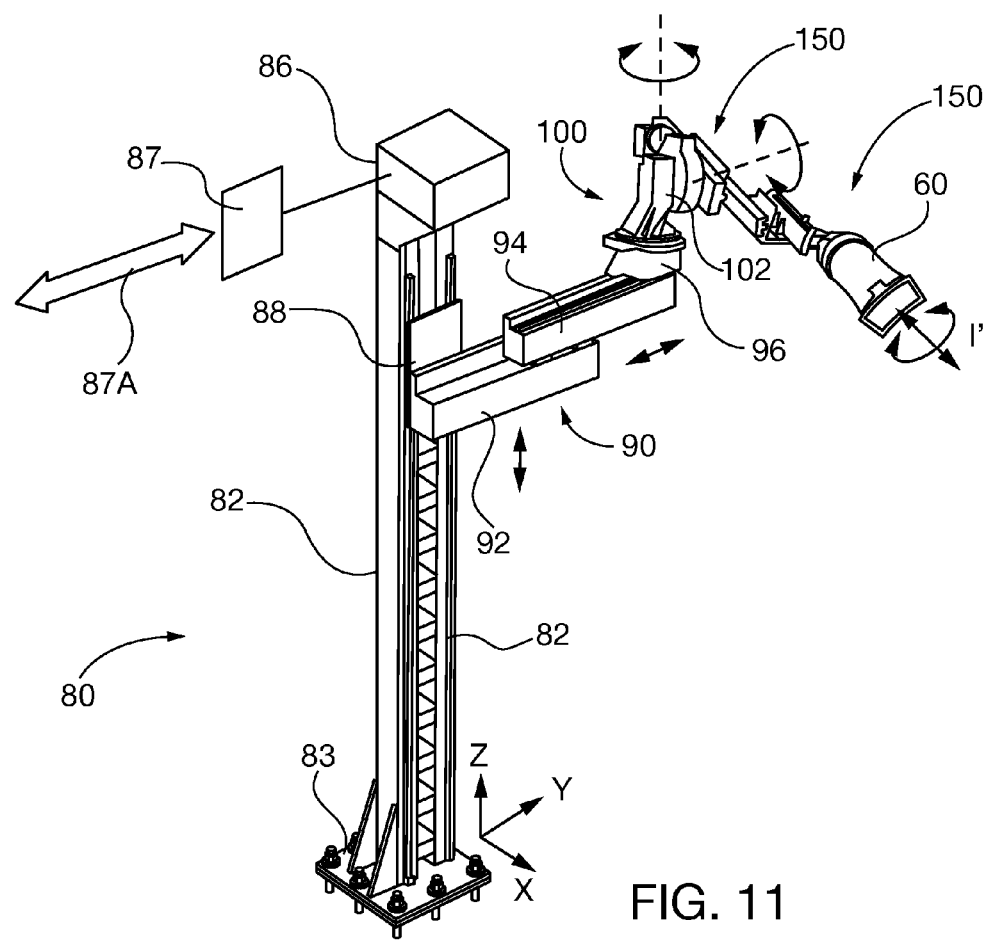
FIG. 11 is a perspective view of an embodiment of a transition handling tool (THT) of the invention.

As shown in the perspective view of FIG. 11, the THT 150 for the right column 82 is shown. A mirror image may be affixed to the left column. The right support column 82 is selectively or permanently coupled to the turbine 20 pad floor structures by foundation mounting plate 83. It is possible to move the THT 150 and its support column 82 from facility to facility for field service, but it is preferable to leave at least one THT permanently at a facility. A motorized or hydraulic crane drive 86 is affixed to the column 82 to provide power for moving the multi-axis THT 150. The crane drive 86 is under control of controller 87. Alternatively, each range of motion of THT 150 or clusters of motion ranges may be driven by separate drives under control of controller 87 or a plurality of inter-communicating controllers.

Figure 12:
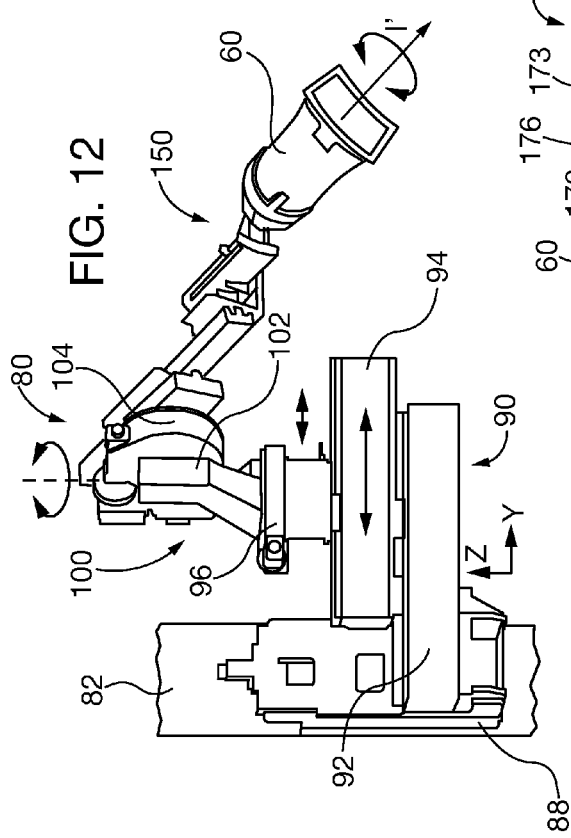
FIG. 12 is an elevational view of an embodiment of the transition alignment platform of the THT of FIG. 11.
Figure 13:
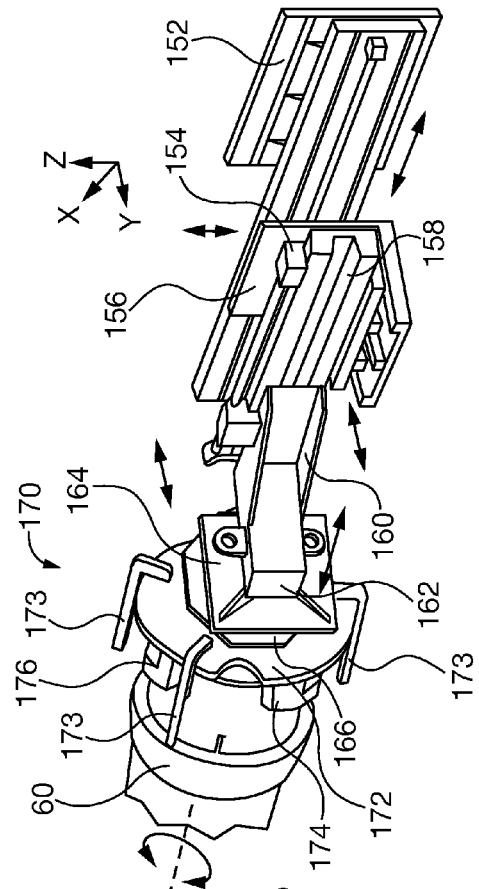
FIG. 13 is a perspective view of an embodiment of the transition alignment platform and transition flange gripper of the THT of FIG. 11.

As shown in FIGS. 11-13, the lifting platform 88 provides THT vertical elevation motion in the Z axis (shown). A combustor/transition alignment platform 90 provides gross left-right (Y axis) motion by first slider 92, second slider 94, and third slider 96. Gross fore-aft (X axis) motion for insertion of the transition assembly 60 into the combustor case access port 32 is facilitated by first and second THT sliders 152, 154. Fine translation motion for final transition assembly 60 movement within the combustor service zone 28 for example to avoid transition contact with other turbine external components or the THT's own components, is provided by third THT slider 156 in the Z axis, fourth THT slider 158 in the in the Y axis, and fifth THT slider 160 in the X axis. The THT 150 also facilitates rotational motion about the three coordinate axes. Turret assembly 100 provides pan or sweep rotation about the Z axis, turret assembly 104 provides tilt or inclination/declination rotation about the Y axis, and THT hub 162 provides rotational about the X axis. Once the transition assembly 60 is in approximate positional alignment with the access port 32 for ultimate insertion into the combustor case 30, the THT hub 162 facilitates rotational alignment of the transition 60 relative to the access port 32 while the sixth and seventh THT sliders 164, 166 align and center the transition assembly 60 concentrically within the access port 32 along insertion path I'. Final insertion of the transition assembly 60 into the combustor case 30 can now be completed by translation of one or more of the THT sliders and or rotational axes.

Figure 14:
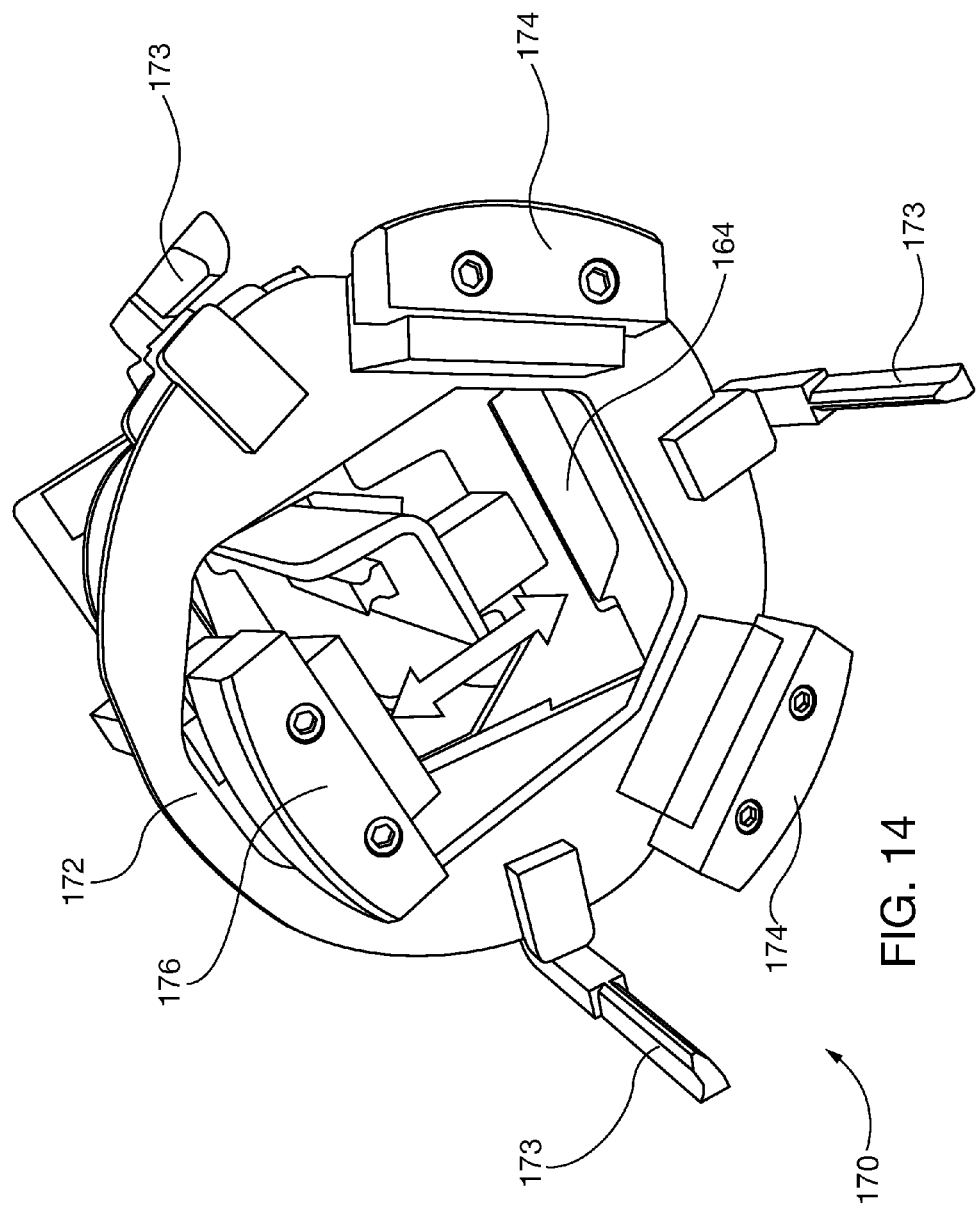
FIG. 14 is an axial perspective view of the transition flange gripper of the THT of FIG. 11.
Figure 15:
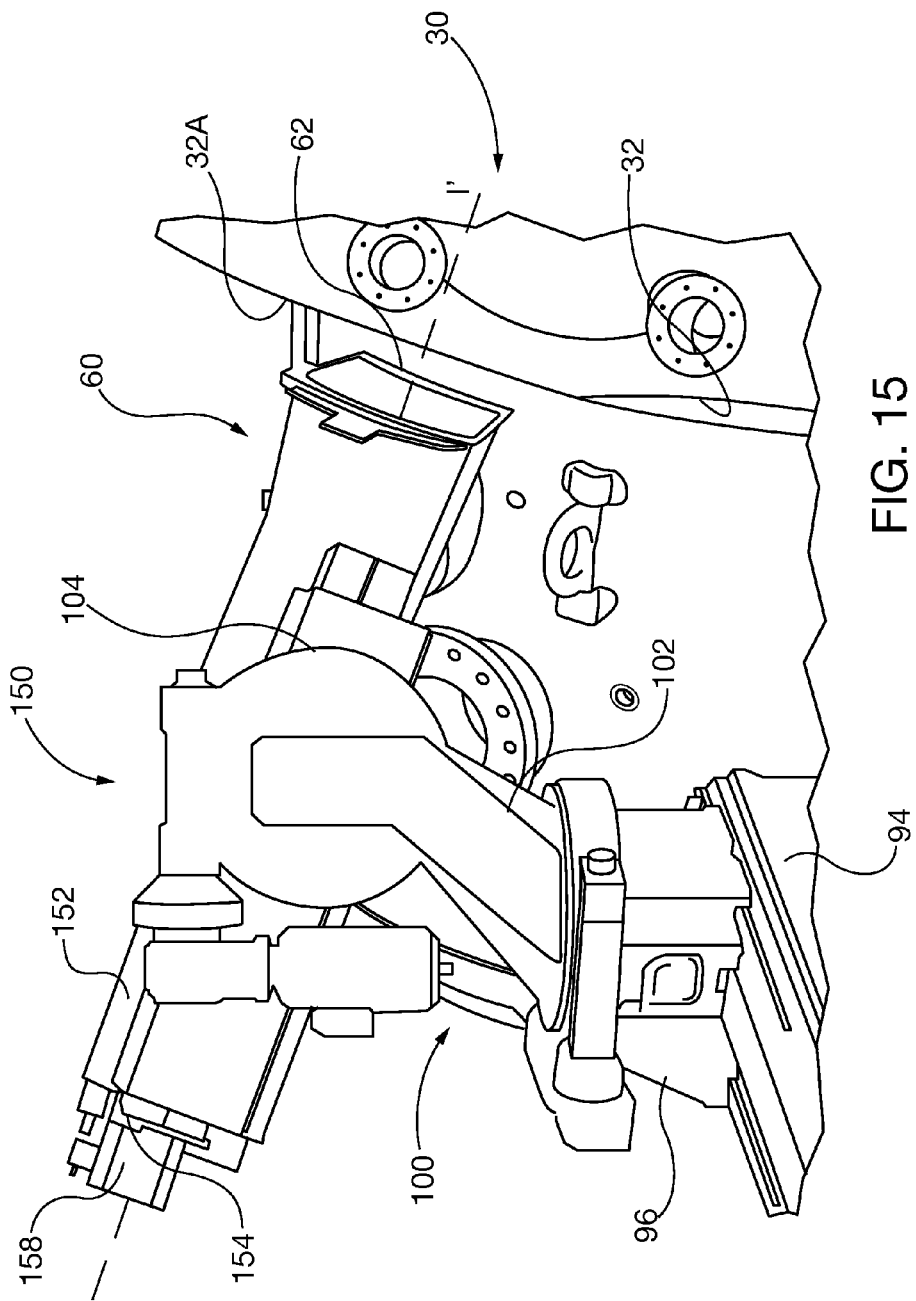
FIG. 15 is side elevational view of the THT of FIG. 11 installing a transition in the combustor service zone of the industrial gas turbine of FIG. 1.

Referring to FIGS. 13 and 14, rotational hub 162/THT sixth and seventh sliders 164, 166 retain a transition gripper 170 that is coupled to a radial flange in the inlet mouth end of the transition 60. The transition gripper 170 has a backing plate 172 that axially abuts against the transition 60 inlet radial flange. External claws 173 restrain the transition inlet flange in concentric radial alignment with internal gripper claws 174, 176. The internal gripper claws 174, 176 have a flanged lip for engagement with the inner diameter of the transition 60 inlet flange. Gripper claws 174 are fixed, whereas gripper claw 176 reciprocates radially under control of known hydraulic, pneumatic or motorized mechanisms (not shown), for engagement with the transition 60 inlet flange. Other types of known mechanical coupling devices may substituted for the gripper claws 173, 174, 176, including by way of example threaded fasteners and apertures 44 in the transition 60 inlet flange, mating keys/keyways or pins/apertures, etc. In FIG. 15 the THT 150 is inserting a transition assembly 60 into combustor access port 32A, that is oriented at approximately the 1 o'clock radial position in the combustor case 30 (see also FIG. 5). The THT 150 aligns the transition assembly 60 concentrically with the insertion path I', which facilitates insertion into access port 32A, without inadvertently impacting the transition assembly with other turbine components within the combustor case 30.

As previously noted the THT 150 motions are controlled by controller 87, which may be a programmable logic controller or a personal computer that utilizes a processor and operating system that accesses a stored instruction set. The controller 87 preferably stores a set of THT 150 motion instructions needed to align and insert combustor transition assemblies 60 within respective individual turbine access ports 32 within reach of the THT. For example in FIG. 15, the THT 150 is capable of inserting one or more transition assemblies 60 into access ports on the right side of turbine 20, and a mirror image THT coupled to the left support column 84 inserts one or more transition assemblies 60 into access ports 32 on the left side of turbine 20. Motion instruction sets stored in the controller 87 are derived from virtual and/or actual THT 150 multi-axis manipulation. A motion instruction set that successfully aligns and installs/retracts one or more transition assemblies 60 in combustor case access ports 32 is stored in the controller 87 and may be downloaded to other controllers. If needed, individual motion instruction sets may be modified to conform to alignment variations needed at different gas turbine installations. The controller 87 may be in wired or wireless communication with a network 87A, such as a power plant local area network or the Internet, for remote monitoring of combustor assembly installation and for receipt of updated or new motion instruction sets.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for installing a transition assembly in an assembled industrial gas turbine engine, comprising:
    providing said assembled industrial gas turbine engine having coupled compressor, combustor, and turbine sections, the combustor section including a combustor case having a combustor access port for receipt of a transition therein that is coaxially aligned therewith along a transition insertion path;
    providing a preassembled, drop-in transition assembly having a mounting flange adapted for slidable coupling with a combustor basket once the transition assembly is inserted into the combustor access port;
    preparing a combustor service zone surrounding the assembled gas turbine engine, for facilitating slidable insertion of the transition assembly into the combustor access port along the transition insertion path without contacting other gas turbine engine external or internal components, the combustor service zone having axial depth at least between the combustor section combustor access port and the compressor section, as well as vertical height and lateral width at least as large as corresponding height and width of the combustor case;
    providing a powered transition handling tool (THT), for slidably inserting the transition assembly into the combustor access port along the transition insertion path, the THT confined within the combustor service zone during transition assembly insertion, the THT including:
        a vertical support column anchored outboard the combustor case within the combustor service zone axial depth;
        a lifting platform, coupled to the vertical support column, for selectively varying vertical elevation within combustor service zone;
        a transition gripper, for coupling to the transition assembly;
        a transition alignment platform, coupled to the lifting platform and the transition gripper, the transition alignment platform including,
        a first slider set for providing selective linear translation of the transition gripper orthogonally with respect to the vertical support column in a lateral width direction within the combustor service zone;
        a second slider set for providing selective linear translation of the transition gripper orthogonally with respect to the vertical support column in an axial depth direction within the combustor service zone;
        a first turret assembly for providing selective tilting inclination/declination of the transition gripper within the combustor service zone;
        a second turret assembly for providing selective sweep/pan pivoting movements of the transition gripper within the combustor service zone; and
        a drive system for driving the lifting platform and the transition alignment platform elevation, translation and pivoting motions during transition assembly insertion along the transition insertion path;
    coupling the transition assembly to the transition gripper;
    slidably inserting the transition assembly into the combustor access port and transition along the transition insertion path with the THT, without contacting other gas turbine engine external or internal turbine components within or outside of the combustor service zone, while confining the THT within the combustor service zone during the transition assembly insertion; and
    coupling the inserted transition assembly to the combustor case.

2. The method of claim 1, comprising inspecting the transition assembly for conformity with assembly and function specifications prior to the inserting and maintaining said assembly specifications after the inserting and coupling.

3. The method of claim 1, comprising a controller coupled to the drive system for automatically controlling the transition handling tool, the controller having a sequence of pre-determined transition assembly insertion manipulation steps.

4. The method of claim 3, comprising installing a plurality of transition assemblies in the gas turbine with the transition handling tool, each respective transition assembly having a sequence of respective, dedicated and pre-determined transition insertion manipulation steps.

5. The method of claim 1, the preassembled modular drop-in transition assembly having internal components in conformity with assembly and function specifications prior to and after insertion into the combustor access port so long as the transition assembly does not impact other turbine components during insertion.

6. The method of claim 5, further comprising coupling the transition assembly mounting flange to the transition gripper.

7. An installation system for an industrial gas turbine engine transition assembly, comprising:
    an assembled industrial gas turbine engine having coupled compressor, combustor, and turbine sections, the combustor section including a combustor case having a combustor access port for receipt of a transition therein that is coaxially aligned therewith along a transition insertion path;
    a preassembled, drop-in transition assembly having a mounting flange adapted for slidable coupling with a combustor basket once the transition assembly is inserted into the combustor access port;

a combustor service zone surrounding the assembled gas turbine engine, for facilitating slidable insertion of the transition assembly into the combustor access port along the transition insertion path without contacting other gas turbine engine external or internal components, the combustor service zone having axial depth at least between the combustor section combustor access port and the compressor section, as well as vertical height and lateral width at least as large as corresponding height and width of the combustor case;

a powered transition handling tool (THT), for slidably inserting the transition assembly into the combustor access port along the transition insertion path, the THT confined within the combustor service zone during transition assembly insertion, the THT including:

a vertical support column anchored outboard the combustor case within the combustor service zone axial depth;

a lifting platform, coupled to the vertical support column, for selectively varying vertical elevation within combustor service zone;

a transition gripper, for coupling to the transition assembly;

a transition alignment platform, coupled to the lifting platform and the transition gripper, the transition alignment platform including, a first slider set for providing selective linear translation of the transition gripper orthogonally with respect to the vertical support column in a lateral width direction within the combustor service zone;

a second slider set for providing selective linear translation of the transition gripper orthogonally with respect to the vertical support column in an axial depth direction within the combustor service zone;

a first turret assembly for providing selective tilting inclination/declination of the transition gripper within the combustor service zone;

a second turret assembly for providing selective sweep/pan pivoting movements of the transition gripper within the combustor service zone; and a drive system for driving the lifting platform and the transition alignment platform elevation, translation and pivoting motions during transition assembly insertion along the transition insertion path.

8. The installation system of claim 7, each transition assembly having internal components in conformity with assembly and function specifications prior to and after insertion into its corresponding combustor access port so long as the transition assembly does not impact other turbine system components during insertion.

9. The installation system of claim 7, comprising a controller coupled to the drive system and controlling movement of the transition handling tool in a sequence of pre-determined transition assembly insertion manipulation steps.

10. The installation system of claim 7, the transition assembly having a mounting flange that is adapted for coupling to the transition gripper.

\* \* \* \* \*